(12) United States Patent
Damsi et al.

(10) Patent No.: US 8,439,424 B1
(45) Date of Patent: May 14, 2013

(54) BRACKET ASSEMBLY FOR MODULAR BOWS IN A TARP SYSTEM AND METHODS OF ASSEMBLING THE SAME

(76) Inventors: Everest Damsi, Waterdown (CA); Luljeta Damsi, Waterdown (CA)

( * ) Notice: Subject to any disclaimer, the term of this patent is extended or adjusted under 35 U.S.C. 154(b) by 0 days.

(21) Appl. No.: 13/397,784

(22) Filed: Feb. 16, 2012

(51) Int. Cl.
*B60P 7/02* (2006.01)

(52) U.S. Cl.
USPC ............. 296/100.18; 296/100.12; 296/100.17

(58) Field of Classification Search ............. 296/100.12, 296/100.17, 100.18, 105
See application file for complete search history.

(56) References Cited

U.S. PATENT DOCUMENTS

| | | | |
|---|---|---|---|
| 4,902,064 A | 2/1990 | Tuerk et al. | |
| 5,080,423 A | 1/1992 | Merlot et al. | |
| 5,429,408 A | 7/1995 | Henning et al. | |
| 5,538,313 A | 7/1996 | Henning | |
| 7,344,178 B2 | 3/2008 | Lowry et al. | |
| 7,931,326 B2 | 4/2011 | Beshiri | |
| 8,172,477 B2 | 5/2012 | Damsi | |
| 2008/0217953 A1* | 9/2008 | Beshiri | 296/100.12 |
| 2011/0091271 A1* | 4/2011 | Damsi | 403/205 |

* cited by examiner

*Primary Examiner* — Joseph Pape
*Assistant Examiner* — Dana Ivey
(74) *Attorney, Agent, or Firm* — MacMillan, Sobanski & Todd, LLC

(57) ABSTRACT

A bracket assembly for securing tarps to a modular bow in a tarp system includes a curved base member that is adapted to be secured to a frame member having adjacent dual channels that extend along an outer surface thereof. A tarp guide is supported on the curved base member. The tarp guide has adjacent dual channels that are separated by a partition. The adjacent dual channels of the tarp guide are adapted to be aligned with the adjacent dual channels of the frame member when the curved base member is secured to the frame member.

20 Claims, 8 Drawing Sheets

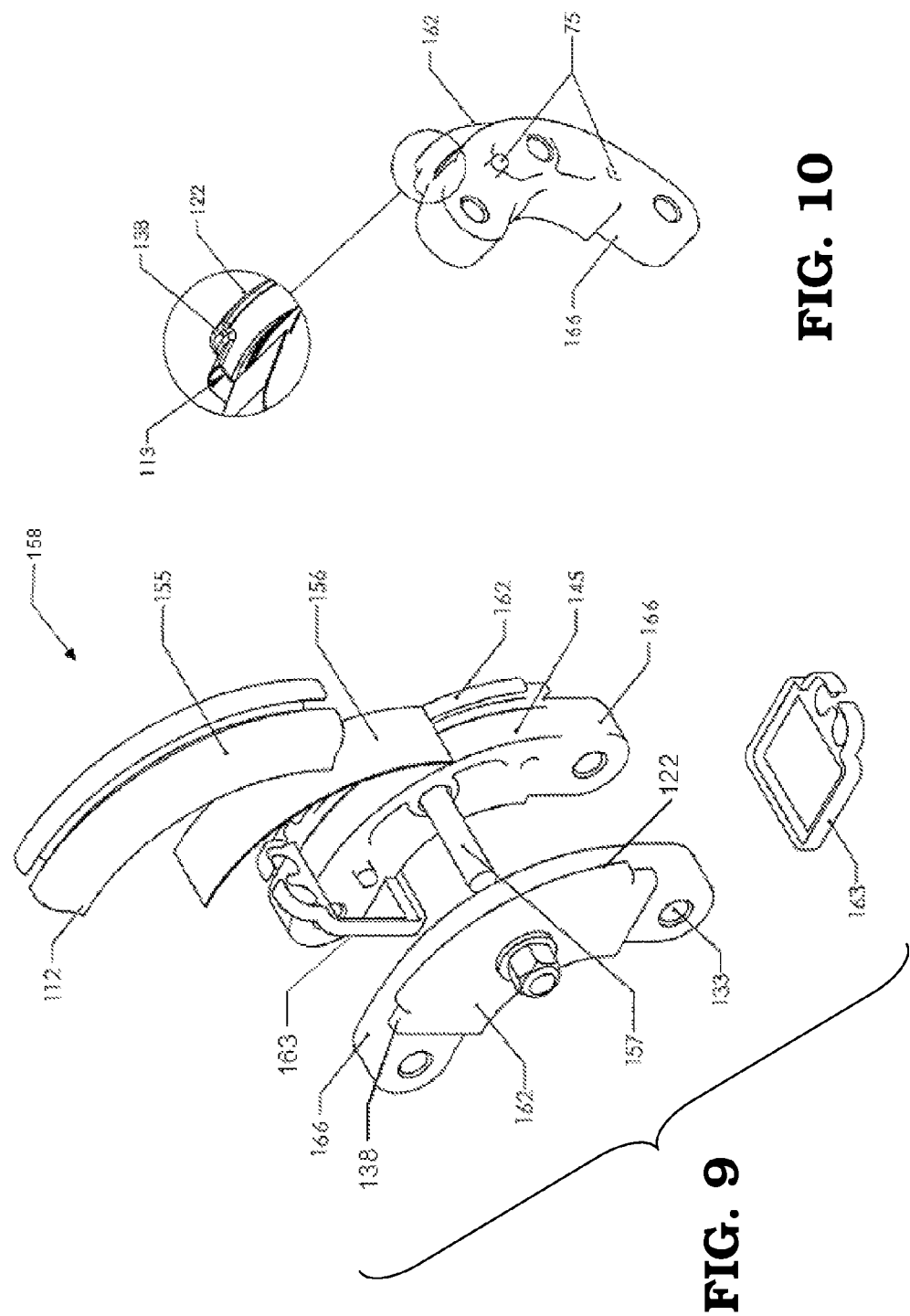

BRACKET ASSEMBLY FOR MODULAR BOWS IN A TARP SYSTEM AND METHODS OF ASSEMBLING THE SAME

BACKGROUND OF THE INVENTION

The present invention relates to the trucking industry and more specifically to tarp systems that can be used for covering flatbeds on trucks and trailers. In particular, this invention relates to a bracket assembly that is used to assemble modular bows in a sliding tarp system and to methods of assembling the same.

Trucks and trailers that have flatbeds are used to transport a wide variety of freight, most of which cannot be loaded into conventional van-type trucks or trailers having walls and a roof. In order to protect the shipped goods from exposure to the outside elements, it is known to cover the flatbed with tarps. A tarp system can be used to secure the tarps to the flatbed to ensure optimal shipping conditions. A typical tarp system comprises a plurality of U-shaped frames that are flipped 180°, commonly referred to as bows, which are attached to the truck or trailer. The bows can be a one piece member or a modular member having two vertical side tubes and a horizontal center tube that are connected together using bracket assemblies. One or more tarps are attached to the bows to create an enclosed cargo area that is generally cube-shaped. The following examples of known tarp systems are provided as a general background.

U.S. Pat. No. 4,902,064 issued to Tuerk et al. discloses a Conestoga-style tarp system using bows that are attached to guide rails secured to sides of the flatbed. The rearmost bow is designed to be tilted or leaned to provide tension to the tarp and to secure the bow. The tarp is a single tarp, which is extended over the bows and supported by tension that is created by the positioning of the rearmost bow. The Tuerk tarp system does not disclose securing the tarp to the individual bows.

U.S. Pat. No. 5,538,313 issued to Henning discloses a tarp system for a flatbed trailer including a plurality of bow members for supporting the tarp. The bow members are slidably mounted to guide rails running along the sides of the flatbed, thus enabling the bow members to be moved to different locations on the flatbed and for the entire assembly to be compressed or expanded as required to load and unload the cargo. Henning is a modified version of the Tuerk system and similarly uses a single tarp supported by tension created by positioning of the bows. There is no disclosure of securing the tarps to the bows.

U.S. Pat. No. 5,080,423 issued to Merlot et al. discloses a segmented tarp cover system. The Merlot tarp system is designed as a series of segmented tarp pieces, which are extended to cover the top of a cargo container, such as a rail care or truck trailer. The Merlot tarp system is designed solely as a top covering and does not disclose any means or method of covering the sides and ends of a cargo container.

Fabricated bows become commonly used in tarp systems for the purpose of cost reduction and to help improve structural design integrity. Fabricated bows typically include a pair of vertical frame members and a central frame member that are welded together using corner fittings. However, the fabricated bows tend to require a large number of welds, which can be labor intensive. In addition, it has been found that the corner fittings at each side of the fabricated bow are critical and particularly troublesome to weld, which is especially true when the bows are made of aluminum.

To overcome these concerns, a tarp system was developed by DeMonte Fabricated Ltd. of Windsor, Ontario that uses modular bows for securing sections of tarp that respectively extend between the bows. The modular bows include a pair of vertical frame members and a central frame member that are connected together using aluminum cast corner fittings. Each modular bow defines a pair of longitudinal channels that extend along the peripheral surface of each bow and protrude outwardly therefrom. The channels are configured to receive support poles, which are provided along edges of the tarp. Further, the modular bows use aluminum castings for the corner fittings. However, it has been found that the DeMonte tarp system can be relatively difficult to assemble because the corner fittings do not completely secure the support poles inside the channels, and the corner fittings are relatively heavy.

U.S. Pat. No. 7,344,178 issued to Lowry et al. discloses a canopy structure for covering a trailer bed of a freight transport vehicle. The canopy structure includes a plurality of bows that are slidably secured to the trailer. The bows include a pair of vertical frame members and a horizontal frame member that are interconnected by corner assemblies. Each corner assembly has a central body portion and a pair of tongues that extend from each side of the central body portion for attachment with the frame members. Sections of tarp extend between the bows and are attached thereto using a tarp holder that is secured along the peripheral surface of each bow. The tarp holder defines a pair of longitudinal channels each configured to receive a beaded edge of the tarp. However, it has been found that the Lowry canopy structure is relatively difficult to assemble and not adequately durable for application on the road.

U.S. Pat. No. 7,931,326 issued to Beshiri et al. discloses a tarp system having tarp connectors for securing tarps to a vehicle. The tarp system includes modular bows having tarp connectors that are assembled together using corner connectors. The tarp connectors include a pair of channels that are configured to receive support poles provided along edges of adjacent tarps. Differently from the DeMonte tarp system described above, the channels provided in the Beshiri tarp system protrude toward an interior portion of the tarp connectors. The corner connectors are formed from two separate pieces that are joined together with bolts, outside and inside the tarp connector surfaces, to form a single piece connector. Each corner connector also defines a single, enlarged channel for receiving a pair of support poles of the tarp. However, it has been found that the Beshiri tarp system can decrease the working surface of the tarp connectors making their function and durability less than desirable. Also, the corner connectors do not have exclusive channels for the support poles. This can make it relatively difficult to insert and slide the support poles through the single channel at the corners and may also create a safety concern by damaging a portion of the tarp that is wrapped around the support poles. Furthermore, the durability of the corner connectors may be less than desirable.

The patents provided above demonstrate the open concerns and limitations of known tarps systems and modular bows. Thus, it would be desirable to provide a bracket assembly that is used to effectively and securely assemble modular bows in a sliding tarp system and to methods of assembling the same.

SUMMARY OF THE INVENTION

This invention relates to a bracket assembly for securing tarps to a modular bow in a tarp system. The bracket assembly includes a curved base member that is adapted to be secured to a frame member having adjacent dual channels that extend along an outer surface thereof. A tarp guide is supported on the curved base member. The tarp guide has adjacent dual channels that are separated by a partition. The adjacent dual channels of the tarp guide are adapted to be aligned with the adjacent dual channels of the frame member when the curved base member is secured to the frame member.

A method of assembling a bracket assembly for use in a tarp system is also disclosed. The method includes the steps of providing a frame member having adjacent channels that extend along an outer surface thereof. A curved base member is provided that is adapted to be secured to the frame member. A tarp guide is supported on the curved base member, wherein the tarp guide includes adjacent dual channels that are separated by a partition. The adjacent dual channels of the tarp guide are aligned with the adjacent dual channels of the frame member by a seal gasket.

Various aspects of this invention will become apparent to those skilled in the art from the following detailed description of the preferred embodiments, when read in light of the accompanying drawings.

BRIEF DESCRIPTION OF THE DRAWINGS

It is expressly understood that the drawings are for the purpose of illustration and description only, and are not intended as limitations of the invention.

FIG. 9 is an exploded, perspective view of a second embodiment of a bracket assembly, in accordance with this invention.

FIG. 10 is an enlarged perspective view of a flange of the bracket assembly shown in FIG. 9.

DETAILED DESCRIPTION OF THE PREFERRED EMBODIMENTS

Figure 1:
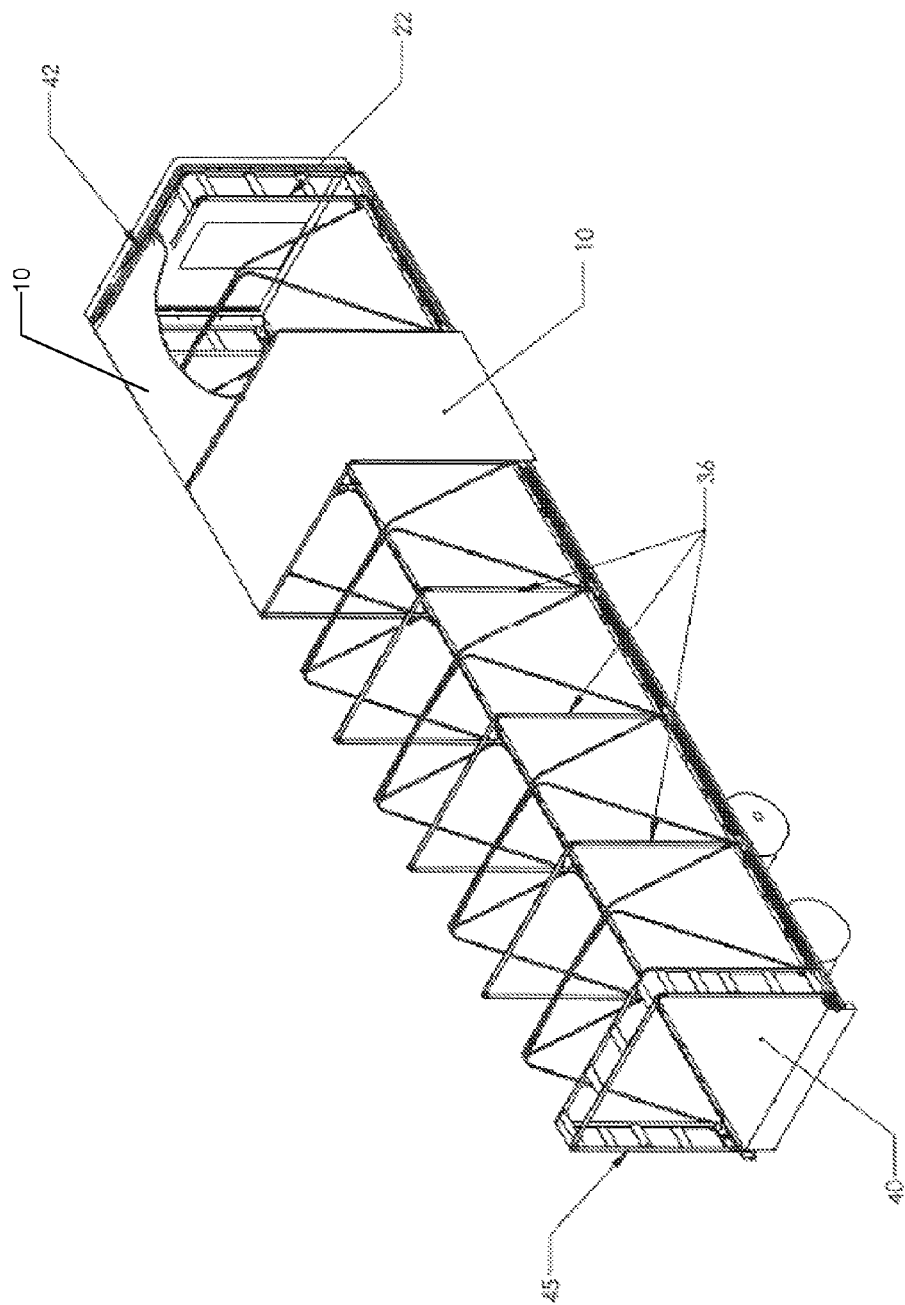
FIG. 1 is a perspective view of a flatbed trailer with a tarp system in accordance with this invention.
Figure 2:
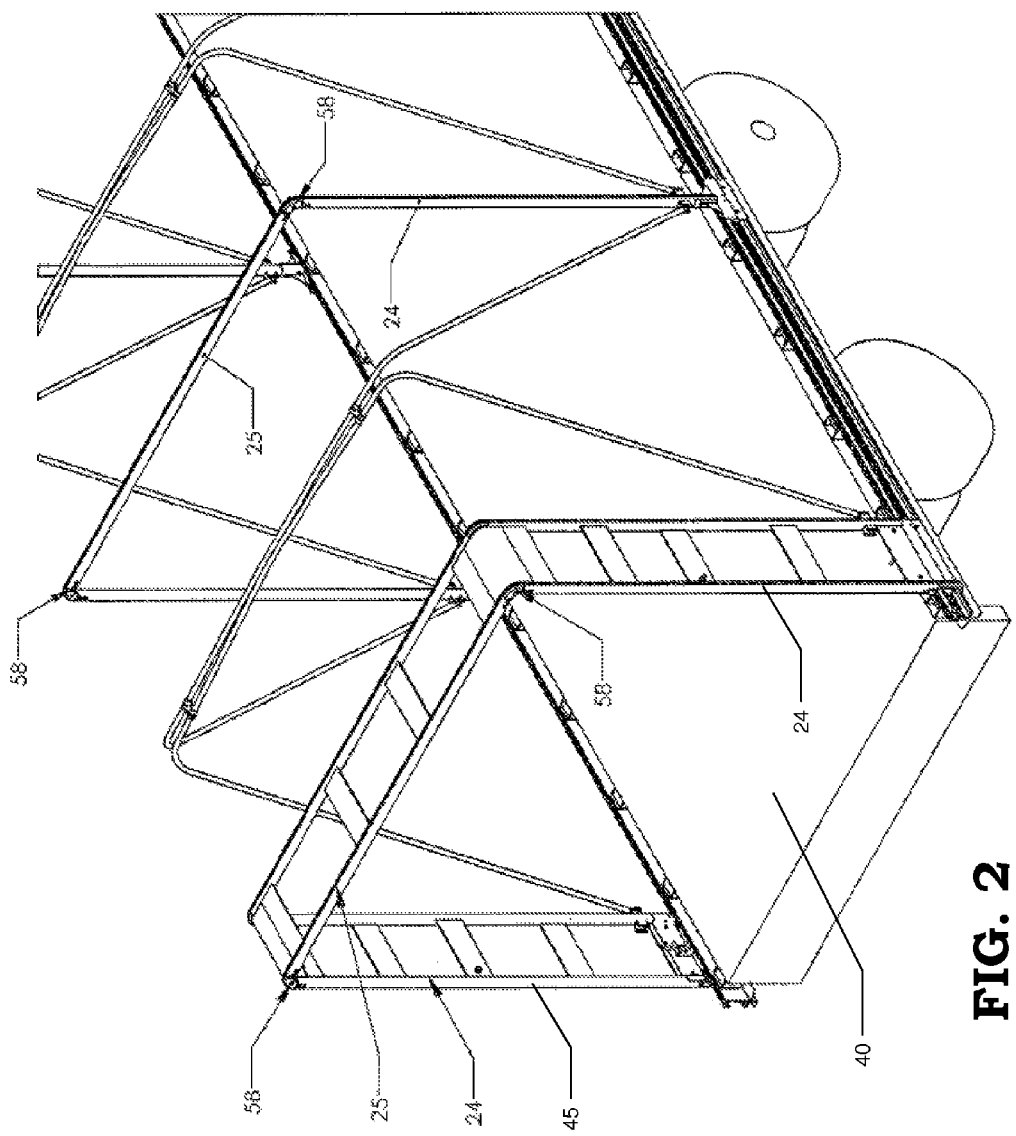
FIG. 2 is an enlarged perspective view of a portion of the flatbed trailer and tarp system as shown in FIG. 1.

Referring now to FIGS. 1 and 2, there is illustrated a flatbed trailer 40 that is partially covered with a sliding tarp system, indicated generally at 42, in accordance with this invention. The illustrated sliding tarp system 42 includes a plurality of modular bows including a front bow 22, any number of intermediate bows 36, and a rear bow 45. As will be further explained below, a tarp section 10 can be attached between the respective bows for creating an enclosed cargo area on the flatbed trailer 40. Although the tarp system 42 is illustrated for use with a flatbed trailer 40, it should be appreciated that the tarp system 42 can be used in any desired environment and for any desired purpose. For example, in addition to the trucking industry, the tarp system 42 may also be used in the rail and shipping industries or any other industry.

The illustrated front, intermediate, and rear bows 22, 36, and 45 form U-shaped members that extend upwardly from a deck of the flatbed trailer 40 so as to form a canopy structure. In one example, the respective ends of the bows 22, 36, and 45 can be movably supported on a sliding track or other movable structure that is secured to sides of the flatbed trailer 40. As such, the tarp system 40 can be extended along the deck to cover any portion of the flatbed trailer 40 or can be retracted when not in use. The bows 22, 36, and 45 may, however, be supported on the flatbed trailer 40 in any manner.

Figure 6:
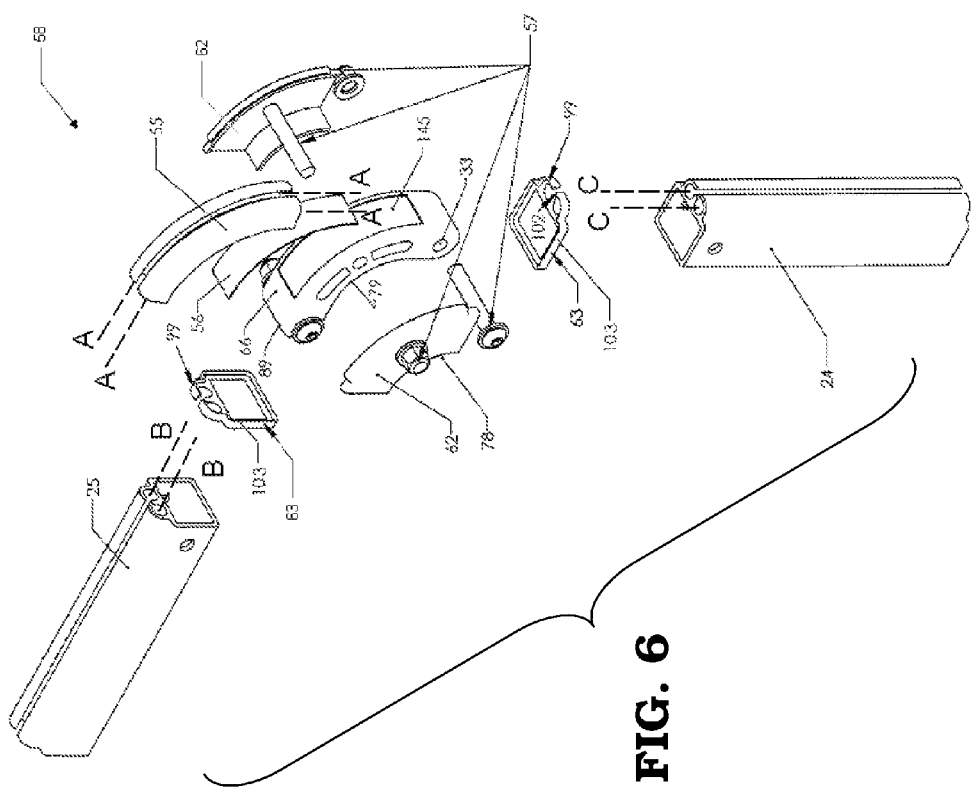
FIG. 6 is an exploded, perspective view of the bracket assembly and frame members shown in FIG. 5.

The front, intermediate, and rear bows 22, 36, and 45 are in large measure similar to one another, although such is not required. Therefore, only one of the bows, such as the front bow 22, will be described in further detail. The illustrated bow 22 includes a pair of vertical frame members 24 and a generally horizontal frame member 25. As shown in FIG. 6, the frame members 24 and 25 are tubular structures having a rectangular cross-sectional shape. Alternatively, the frame members 24 and 25 may have any cross-sectional shape, including but not limited to an oval or any other polygonal shape. The frame members 24 and 25 may also be formed from any desired material, such as steel or aluminum, using any suitable process.

The illustrated frame members 24 and 25 define a pair of adjacent channels, shown generally at 24a and 25a, that extend along a length of the frame members 24 and 25 in parallel fashion. The channels are respectively defined by a pair of support walls that extend outwardly from an outer surface of the frame members 24 and 25 and toward one another at their free ends. The free ends of the support walls are spaced apart from one another to form a gap there between. A partition extends outwardly from the outer surface of the frame members 24 and 25 between the support walls and is spaced from the free ends thereof. The illustrated support walls and partition form separate, adjacent channels 24a and 25a having generally circular cross-sectional shapes. The channels 24a and 25a have slots that extend along the lengths thereof for securing the tarp section 10 to the bow 22, as will be explained below.

Referring again to FIG. 2, the illustrated frame members 24 and 25 are respectively connected together at their ends by a pair of bracket assemblies 58, in accordance with a first embodiment of this invention. The illustrated bracket assemblies 58 are in large measure similar to one another. Therefore, only one bracket assembly 58 will be described in further detail.

As shown in FIGS. 3 through 6, the illustrated bracket assembly 58 includes a curved base member 66. The curved base member 66 is configured to secure the bracket assembly 58 to the frame members 24 and 25, as will be explained below. A tarp guide 55 is supported on an outer surface of the curved base member 66 and secured thereto by a pair of flanges 62. The flanges 62 are secured together by a fastener 57 extending through respective holes 115 (see FIG. 8). A seal 56 is positioned between the tarp guide 55 and the curved base member 66. A pair of seal gaskets 63 is positioned between opposite ends of the bracket assembly 58 and the frame members 24 and 25, respectively. The bracket assembly 58 may, alternatively, include any combination or arrangement of components. Each of the components will now be described in further detail.

The illustrated curved base member 66 is a generally hollow member, but may be a solid member if desired. Opposite ends 89 of the curved base member 66 are configured to be received within internal portions of the frame members 24 and 25 in mating fashion, respectively. The ends 89 can have rounded edges or may otherwise define a radius to facilitate accurate and efficient connectivity of the curved base member 66 with the frame members 24 and 25. A hole 33 extends through each end 89 of the curved base member 66. When the bow 22 is assembled, as will be explained below, the hole 33 is aligned with a set of holes that is formed in side walls of the frame members 24 and 25, respectively. A fastener 57 can be inserted through the aligned holes for securing the curved base member 66 to the frame members 24 and 25.

As shown in FIG. 6, the curved base member 66 may also include a landing area 145 that is configured to facilitate alignment of the tarp guide 55 relative to the curved base member 66 and to improve compression and security between the components, as will be further explained below. The illustrated landing area 145 is a window that is formed in an outer surface of the curved base member 66. Alternatively (or in addition), the landing area 145 may include raised ribs or other structural features to facilitate alignment of the tarp guide 55. The rubber seal 56 is provided between the tarp guide 55 and the curved base member 66 to help secure the landing of the tarp guide 55 and to improve durability and safety of the bracket assembly 58.

Figure 3:
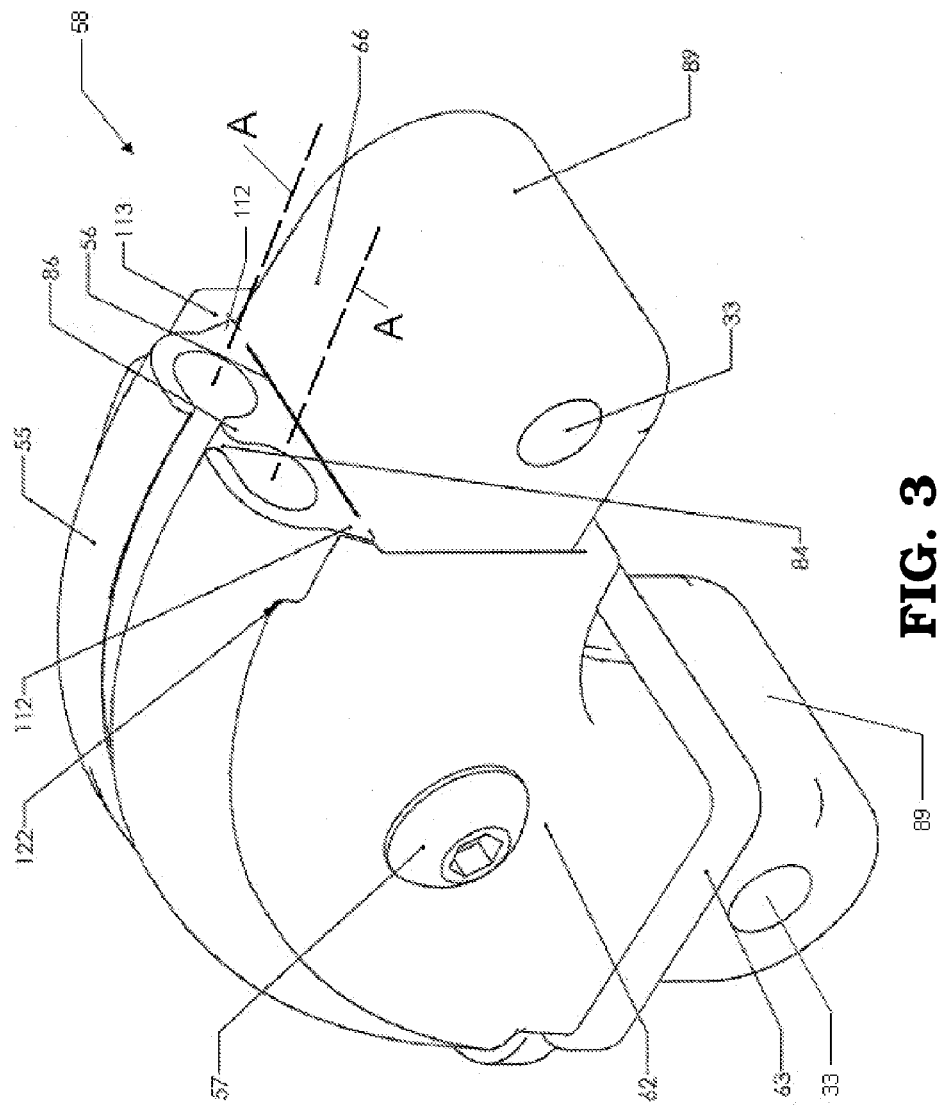
FIG. 3 is an enlarged perspective view of first embodiment of a bracket assembly of the tarp system shown in FIGS. 1 and 2, in accordance with this invention.
Figure 7:
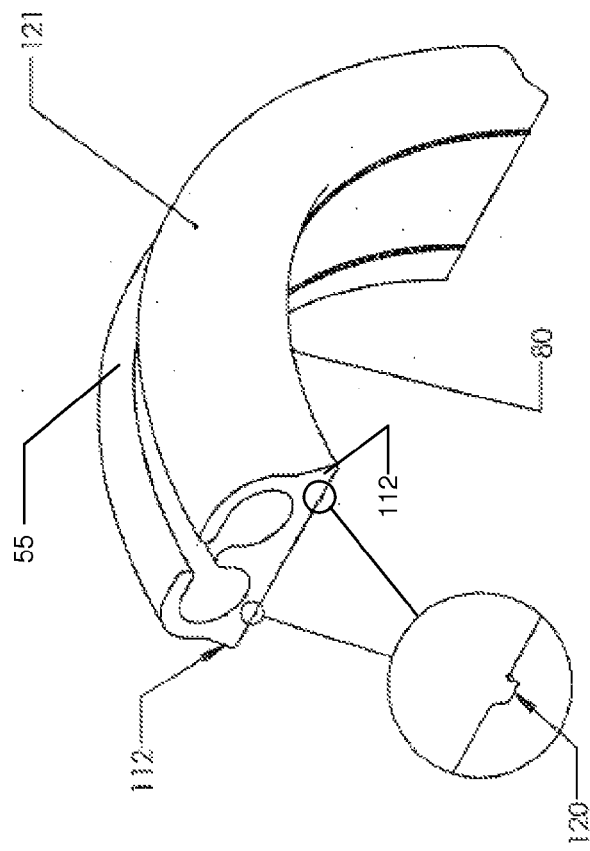
FIG. 7 is an enlarged perspective view of a tarp guide of the bracket assembly shown in FIG. 3.

As shown in FIGS. 3 and 7, the tarp guide 55 is a curved member that generally corresponds with the outer surface of the curved base member 66. The illustrated tarp guide 55 includes a base portion having a pair of support walls that extend outwardly from the base portion and towards one another at their free ends. A partition 86 extends outwardly from the base portion between the support walls and is spaced from the free ends of the support walls to define slots 84. The support walls and partition 86 define separate, adjacent channels 39 (see FIG. 4) having generally circular cross-sectional shapes. The slots 84 that extend along the lengths of the channels 39 for securing the tarp section 10 to the bow 22, as will be explained below.

The illustrated tarp guide 55 includes outwardly protruding edges 112 that extend along opposites sides of the base portion thereof. The edges 112 are configured to help secure the tarp guide 55 to the curved base member 66, as will be explained below. The illustrated tarp guide 55 may also include protrusions 120 (see FIG. 7) that extend along and protrude outwardly from an inner surface of the base portion. The protrusions 120 facilitate alignment and proper positioning of the tarp guide 55 relative to the curved base member 66 and the flanges 62 when assembled and to secure the functioning of the tarp guide 55 as will be described below.

Figure 8:
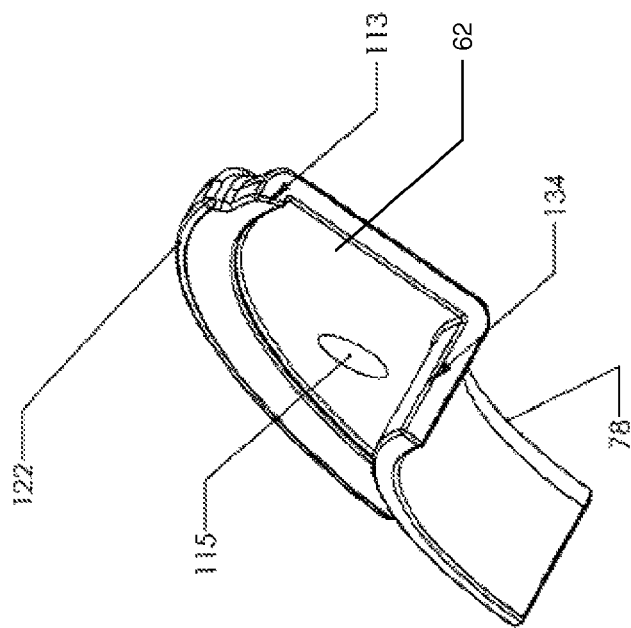
FIG. 8 is an enlarged perspective view of a flange of the bracket assembly shown in FIG. 3.

As shown in FIGS. 6 and 8, the flanges 62 are in large measure similar to one another, although such is not required. Therefore, only one flange 62 will be described in further detail. The illustrated flange 62 is a curved member that generally corresponds with a side of the curved base member 66. The flange 62 includes a side wall having a first lip 113 that extends inwardly along a circumference of an upper edge thereof. The illustrated flange 62 also includes a second lip 122 that further extends inwardly at an incline from the first lip 113, although such is not required. As shown, the second lip 122 is circumferentially spaced from the ends of the flange 62 and the first lip 113. The flange 62 may also include a base 134 that extends from the side wall along a portion of a lower edge thereof. The base 134 can control the tightening application of the bracket assembly 58 and to keep the same consistent cleanness of the bows and avoid any interferences of the cargo load. The base 134 of the flange 62 defines a radius that permits the maximum cargo load of the flatbed trailer 40.

As shown in FIG. 6, the illustrated seal gaskets 63 are in large measure similar to one another. Therefore, only one seal gasket 63 will be described in further detail. The seal gasket 63 is configured to be positioned between the bracket assembly 58 and end of the respective frame members 24 and 25. Thus, the illustrated seal gasket 63 defines a first portion that corresponds with the general cross-sectional shape of the frame members 24 and 25 and a second portion that corresponds with the channels of the frame members 24 and 25 and the tarp guide 55. The second portion includes edges 99 and 102 that facilitate alignment of the channels 39 in the tarp guide 55 with the channels in the frame members 24 and 25. The edges 99 and 102 also provide a transition area between the frame members 24 and 25 and the tarp guide 55 for allowing easy passage of the tarp section 10 through the bracket assembly 58 without any impediments. The seal gasket 63 may also include an outer surface or extended border that extends along the external surfaces of the frame members 24 and 25 and the bracket assembly 58. The outer wall helps to align the channels 39 of the tarp guide 55 with the channels of the frame members 24 and 25 and seals and couples the bracket assembly 58 with the frame members 24 and 25, as will become apparent.

The assembly of the bracket assembly 58 and the frame members 24 and 25 will now be described with reference to FIG. 6. The seal 56 is initially positioned between the tarp guide 55 and the curved base member 66. The tarp guide 55 is then aligned with the curved base member 66 by aligning the protrusions 120 with the landing area 145. Once the tarp guide 55 is in proper position, the flanges 62 are secured to the opposite sides of the curved base member 66 and secured together using the fastener 57, which extends through both the flanges 62 and the curved base member 66. Since the tarp guide 55 is a separate component from the curved base member 66, the channels 39 of the tarp guide 55 can be easily aligned with the channels of the frame members 24 and 25. It should be appreciated, however, that the tarp guide 55 can be secured to the curved base member 66 in any manner, including but not limited to a bolted connection or a welded connection.

The first lips 113 of the flanges 62 engage the edges 112 of the tarp guide 55 in mating fashion for securing the tarp guide 55 to the curved base member 66. The second lips 122 of the flanges 62 engage curved outer surfaces 121 of the tarp guide 55, which provides redundancy for securing the tarp guide 55 to the curved base member 66. This design helps to secure the functioning and the coupling of the tarp guide 55 with the frame members 24 and 25. This design also acts to control the centerlines A of the channels 39 of the tarp guide 55 with the respective centerlines B and C of the channels 24a and 25a of the frame members 24 and 25 to form a substantially continuous dual channeled conduit.

Furthermore, the partition 86 is held in alignment with and supported for continuous contact with the respective partition of the frame members 24 and 25. In effect, the partition 86 becomes part of the adjacent channels 39. This design separates the channels in the curved area of the bracket assembly 58 and also functions to receive, capture, and secure the tarp end when the system is tight.

The seal gaskets 63 are then placed over the ends 89 of the curved base member 66. The ends 89 of the curved base member 66 are respectively inserted into the internal portions of the frame members 24 and 25 and secured therein using fasteners. The same procedure can be repeated any number of times until the bow 22 is fully assembled.

Figure 4:
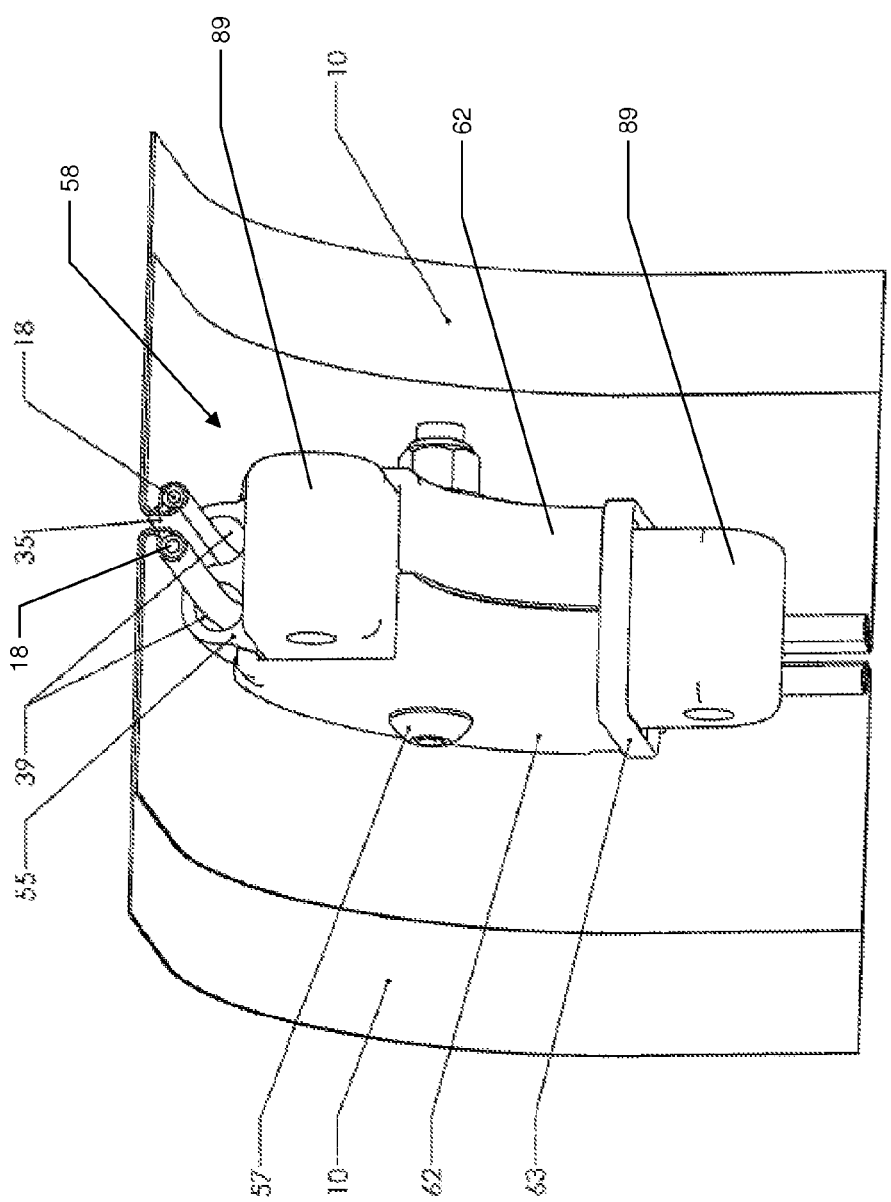
FIG. 4 is a perspective view of the bracket assembly shown in FIG. 3 in a normal working condition, connecting two adjacent tarp sections to the bracket assembly.
Figure 5:
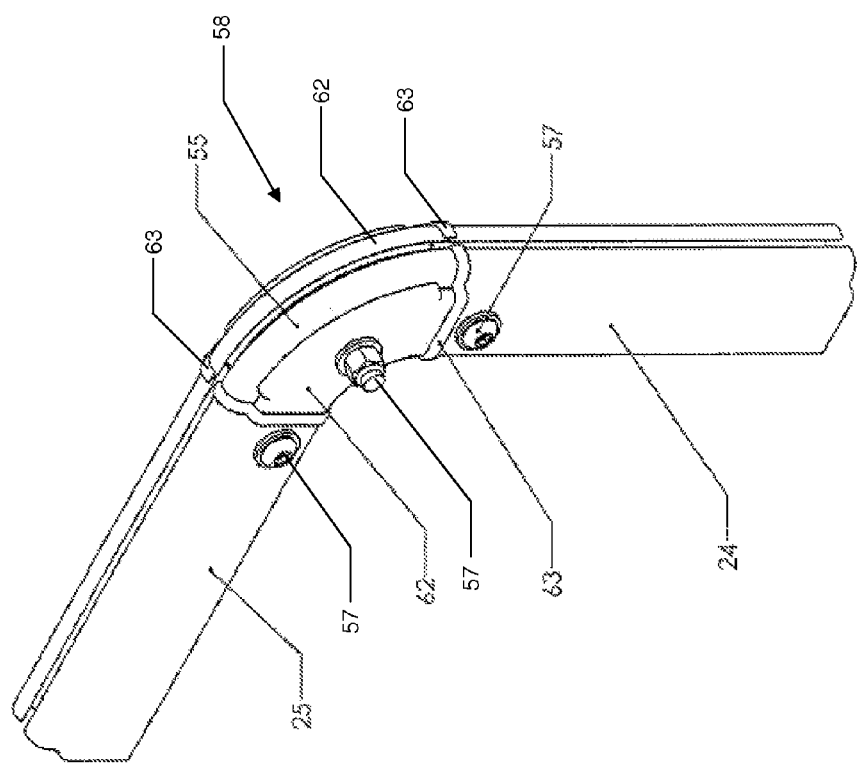
FIG. 5 is a perspective view of the bracket assembly shown in FIG. 3 coupled with frame members of a bow of the tarp system.

The assembly of the tarp sections 10 with the bow 22 will now be described with reference to FIG. 4. The illustrated tarp sections 10 include support poles 18 secured along their respective edges. For example, a portion of each tarp section 10 can be wrapped around the support pole 18 and overlapped on itself. The overlapped portion of the tarp section 10 can then be secured together in any manner. The support pole 18 can then be inserted into and slid within the aligned channels of the frame member 24 and the bracket assemblies 58 for securing the tarp section 10 to bow 22. For example, the slot opening 84 in the tarp guide 55 is restricted to not allow the overlapped portion of the tarp and the support pole 18 from passing there through.

The illustrated tarp guide 55 is also configured to provide a space 35 between the respective tarp portions 10 to allow an easy slide of the overlapped portion the tarp 10, permitting both tarp sections 10 to slide and work separately as a result of the separate channels 39. The passage of the tarp and support pole 18, in the transition area of the bracket assembly 58, to and from the frame members 24 and 25 is secured without impediment through the unique edges 99 and 102 of the seal gaskets 63 and the partition 86. The tarp guide 55 with one or more edges 112, slots 84, and partition 86 is the unique component that secures and transcends the passage of the tarp and the support pole 18 in the separate channels 39 and allows for a compact and safe solution for tarp sliding systems. A flange radius 78, curved base member radius 79, or tarp guide radius 80 provide the maximum cargo area inside the bows 22, 36 and 45 and allow the most optimistic external dimensions according to Department Of Transportation (DOT).

Referring now to FIGS. 9 and 10, there is illustrated a bracket assembly, indicated generally at 158, in accordance with a second embodiment of this invention. The illustrated bracket assembly 158 includes a flange 162 that is integrally formed with a curved base member 166, creating a unique compact single component having all of the structural features of the curved base member 66 and the flanges 62, described above in the first embodiment. As shown in FIG. 9, the assembly includes two identical and symmetrical mirror flanges 162. Therefore, only one of the flanges 162 will be described in further detail. The illustrated flange 162 has a first lip 113 for tightening and mating with an edge 112 of a tarp guide 155. As shown, the flange 62 may also include a pinning system 75 having pins that extend from an inner surface thereof that facilitates easy set up and assembly of the bracket assembly 158. The mating flanges 162 are retained together by a fastener 157, similar to fastener 57 described above. The illustrated flange 162 and curved base member 166 component also has a landing area 145, a hole 133, and a second lip 122 having a notch edge 138. The illustrated bracket assembly 158 further includes a tarp guide 155, a pair of seal gaskets 163, and a seal 156 as in the first embodiment. It should be appreciated, however, that the bracket assembly 158 may include any combination or arrangement of components as desired.

The bracket assembly description and both embodiments conclude the description of a present invention. Other routine variations of the above principles will be apparent to those who are knowledgeable in the field of the invention, and such variations are considered to be within the scope of the present invention. It must be understood that this invention may be practiced otherwise than as specifically explained and illustrated without departing from its spirit or scope.

What is claimed is:

1. A bracket assembly for securing a tarp to a bow in a tarp system, the bracket assembly comprising:
   a curved base member that is adapted to be secured to a frame member having adjacent dual channels extending along an outer surface thereof; and
   a tarp guide that is supported on the curved base member, the tarp guide having adjacent dual channels that are separated by a partition, wherein the adjacent dual channels of the tarp guide are adapted to be aligned with the adjacent dual channels of the frame member when the curved base member is secured to the frame member.

2. The bracket assembly of claim 1, further including a pair of flanges that secure the tarp guide to the curved base member.

3. The bracket assembly of claim 2, wherein the flanges each define one or more lips and the tarp guide is secured between the one or more lips of the flanges.

4. The bracket assembly of claim 3, wherein the tarp guide defines angled edges that extend outwardly from opposite sides thereof and further defines curved outer surfaces, the one or more lips of the flanges define first lips that mate with the angled edges of the tarp guide, the flanges further including second lips that engage the curved outer surfaces of the tarp guide.

5. The bracket assembly of claim 1, wherein centerlines of the adjacent dual channels of the tarp guide are aligned with centerlines of the adjacent dual channels of the frame members when the curved base member is secured to the frame member.

6. The bracket assembly of claim 1, wherein the tarp guide includes protrusions that extend outwardly to hold the tarp guide in place on the curved base member.

7. The bracket assembly of claim 2, wherein the curved base member and the flanges are separate members.

8. The bracket assembly of claim 1, wherein the curved base member includes a landing area that allows fastening, security, and compression of the tarp guide on the curved base member.

9. The bracket assembly of claim 1, further including a seal gasket that is adapted to be disposed between the tarp guide and the frame member, wherein the seal gasket has edges that allow a support pole wrapped by a tarp to slide between the tarp guide and the frame member without impediment, and wherein the seal gasket has an extended border which aligns and seals the bracket assembly with the frame member.

10. The bracket assembly of claim 2, wherein the flanges have a base portion that interacts with the curved base member and allows high compression to be applied to the tarp guide.

11. A bracket assembly for securing a tarp to a bow in a tarp system, the bracket assembly comprising:
   a pair of flanges that are connected together and engage a curved base member, the curved base member adapted to be secured to a frame member having adjacent dual channels that extend along an outer surface thereof; and
   a tarp guide that is supported on the flanges, the tarp guide having adjacent dual channels that are separated by a partition, wherein the adjacent dual channels of the tarp guide are adapted to be aligned with the adjacent dual channels of the frame member when the flanges are secured to the frame member.

12. The bracket assembly of claim 11, wherein the flanges each define one or more lips and the tarp guide is secured between the one or more lips of the flanges.

13. The bracket assembly of claim 12, wherein the tarp guide defines angled edges that extend outwardly from opposite sides thereof and further defines curved outer surfaces, the one or more lips of the flanges define first lips that mate with the angled edges of the tarp guide, the flanges further including second lips that engage the curved outer surfaces of the tarp guide.

14. The bracket assembly of claim 11, wherein the flanges define a landing area for compressing and securing the tarp guide to the flanges.

15. The bracket assembly of claim 11, further including a seal gasket that is adapted to be disposed between the tarp guide and the frame member, wherein the seal gasket has edges that allow a support pole wrapped by a tarp to slide between the tarp guide and the frame member without impediment, and wherein the seal gasket has an extended border which aligns and seals the bracket assembly with the frame member.

16. The bracket assembly of claim 11, wherein the flanges include a pinning system that facilitates easy set up and assembly of the bracket assembly.

17. The bracket assembly of claim 11, wherein the flanges include a second inclined lip that engages the tarp guide to provide security in redundancy of the tarp guide.

18. The bracket assembly of claim 11, wherein the bracket assembly and one or more frame members are secured together to form a continuous dual channeled conduit.

19. A method of assembling a bracket assembly and bow for use in a tarp system comprising the steps of:
 a) providing a frame member having adjacent channels that extend along an outer surface thereof;
 b) providing a curved base member that is adapted to be secured to the frame member;
 c) supporting a tarp guide on the curved base member, wherein the tarp guide has adjacent channels that are separated by a partition; and
 d) securing the curved base member to the frame member such that the adjacent channels of the tarp guide are aligned with the adjacent channels of the frame member.

20. The method of claim 19, further including the step of securing a pair of flanges to the curved base member, wherein the flanges have one or more lips for securing the tarp guide to the curved base member.

* * * * *